Sept. 24, 1929.  A. SCHILLINGER  1,729,188
SAFETY ELEVATING HOOK
Filed June 14, 1928
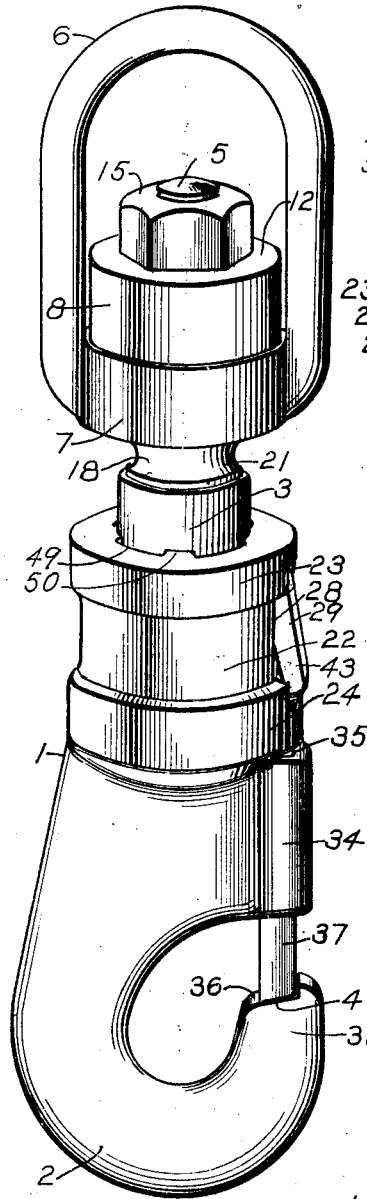
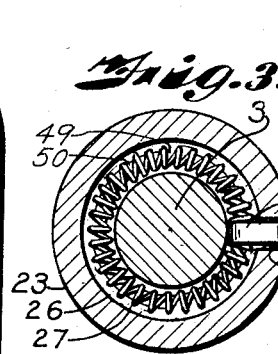
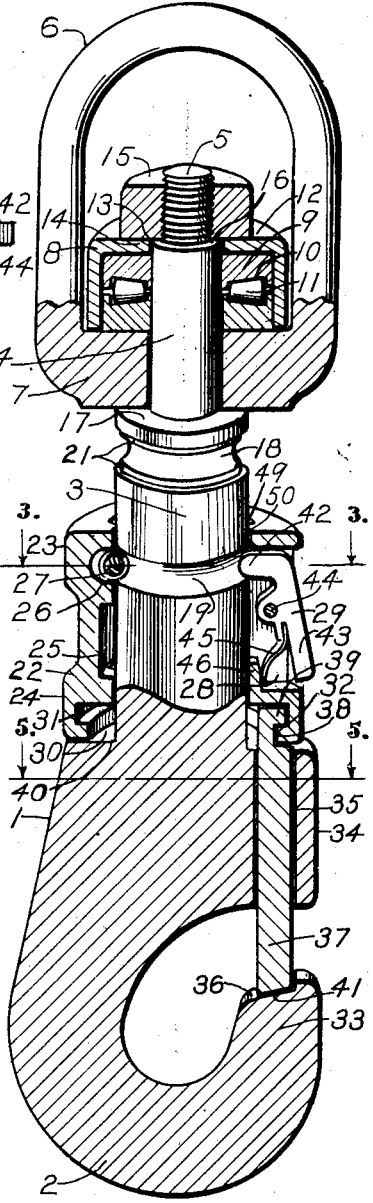
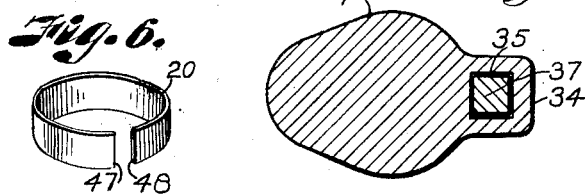
INVENTOR.
Adolph Schillinger
BY
ATTORNEYS.

Patented Sept. 24, 1929

1,729,188

UNITED STATES PATENT OFFICE

ADOLPH SCHILLINGER, OF TULSA, OKLAHOMA

SAFETY ELEVATING HOOK

Application filed June 14, 1928. Serial No. 285,348.

My invention relates to elevating hooks and more particularly to a safety elevating hook used in connection with hoisting apparatus in oil well or mine operations, on shipboard or for other hauling purposes, the principal object of the present invention being to obviate interference of the latch mechanism of the hook with the rigging and thus prevent the accidental opening of the latch and the displacement of a bail from the hook during a hoisting operation.

A further object of the invention is to provide a hook having self-contained means for retaining the latch in open or closed position as desired.

In accomplishing these and other objects of the invention I have provided improved details of structure, the preferred forms of which are illustrated in the accompanying drawings, wherein:

Fig. 1 is a perspective view of the assembled hook.

Fig. 2 is a central longitudinal section through the hook.

Fig. 3 is a section on the line 3—3, Fig. 2.

Fig. 4 is a detail perspective view of the latch pin.

Fig. 5 is a section on the line 5—5, Fig. 2.

Fig. 6 is a detail view of a spring clip for modifying the operation of the device.

Referring in detail to the drawings:

1 designates the hook body having a hook portion 2 at one end for receiving a bail and having a shank 3 at its opposite end terminating in a reduced stem 4, the stem being provided with a reduced threaded end portion 5. A clevis 6 whereby the hook may be attached to a hoisting cable, is provided with a collar 7 mounted on the lower portion of the reduced stem 4, and seated on the collar and mounted on the upper portion of the stem 4 is a roller bearing unit 8 of a conventional type consisting of mated race members 9 having annular grooves 10 fitted with anti-friction rollers 11 to provide for free swiveling movement of the hook with relation to the clevis.

In order to eliminate dust or foreign matter from the swivel bearing 8, I provide an inverted cup-shaped cover member 12 fitted closely over the bearing and provided with a central opening 13 in its upper end 14 to receive the stem 4.

The clevis 6, bearing 8 and cover member 12 are retained in assembled relation on the stem 4 by a nut 15 on the threaded end portion 5, which bears against the shoulder 16 at the end of the stem 4, the nut being thus retained from close engagement with the end portion of the cover 12, whereby the swiveling members are loosely mounted between the nut 15 and a shoulder 17 produced by the reduction of the shank 3 to form the stem 4.

Vertically spaced annular grooves 18 and 19 are provided in the shank 3, and a groove-closing clip 20 is provided and adapted to seat in annular recesses 21 having right angular seats in the edges of the upper groove 18 for a purpose later described.

Slidably and rotatably mounted on the shank 3 is a latch collar member 22 having enlarged upper and lower end portions 23 and 24 and an internal annular recess 25 between said portions 23 and 24 for reducing the area of the bearing surface of the collar. Located in a substantially central position with relation to the upper end portion 23 is an internal annular groove 26 adapted for registering alternately with the grooves 18 and 19 when the collar 22 is shifted vertically to its upper or lower registering positions on the shank 3.

Mounted on the shank is a compression spring 27 normally seated in one or another of the grooves 18 and 19 and extending into the groove 26. The spring is loosely wound to permit retreat of substantially its entire body into the groove 26 of the collar, in order that the spring may pass from the groove 18 or 19 and over the portion of the shank between the grooves, when the collar is shifted from its lower to its upper registering position, or vice versa.

Pivotally supported in a recess 28 of the collar 22 is a locking lever 29 projectable into the groove 18 or 19 of the shank 3 for locking the collar in its upper or lower poposition, as later described.

A counterbore 30 is provided in the lower end of the collar 22 and an annular groove 31 in the upper portion of the counterbore produces an inwardly projecting flange 32 for engagement by latching means hereafter described.

Formed on the body 1 of the hook and aligning with the bill 33 of the hook portion 2, is a longitudinally extending boss 34 provided with a squared opening 35, extending vertically therethrough and aligning with an undercut and tapered seat 36 formed on the end of the bill 33.

Slidably mounted in the opening 35 of the boss 34 is a latch pin 37 having a recess 38 in one side adjacent its upper end, and a tooth 39 formed at its end by the recess, the upper portion of the pin extending above the opening 35 into the counterbore 30 of the collar. The flange 32 of the collar is engaged in the recess 38 of the pin, the tooth 39 being engaged in the groove 31 of the collar above the flange, thus effecting a rotatable connection between the collar and the latch pin whereby the collar may rotate over the shoulder 40 formed by the reduction of the body to produce the shank, while engaged with the pin 37, and may move the pin vertically.

The lower end 41 of the latch pin 37 is beveled to conform to the seat 36 on the end of the hook bill 33 and when the collar is in its lower registering position, the end 41 of the pin is engaged on its seat.

The locking lever 29 preferably comprises a nose or latch portion 42 engageable in the grooves 18 and 19, and a handle portion 43 normally projecting from the recess 28 of the collar, and is pivoted on a pin 44 fixed in the collar. A flat spring 45 fixed to the lever bears against a ledge 46 in the lower end of the recess and normally urges the lever nose toward the shank 3.

The spring clip 20 is provided for mounting in the recesses 21 of the upper groove 18 of the collar above referred to, to close the groove against entrance of the spring 27 therein, the locking lever 29 being permitted to enter the groove when the clip is in position by passing between the spaced ends 47 and 48 of the clip.

Longitudinal internal grooves or slots 49 are preferably formed in the collar 22 to provide arcuate spaced bosses or ribs 50, shown as four in number, for sliding engagement with the shank to reduce frictional contact, the recess 25 and the groove 26 respectively comprising aligned slots in the ribs. The ribs have the further function of scraping the shank to dislodge and remove grease, paraffin, sand and other foreign matter to clean the shank and prevent interference by such matter with the movement of the collar.

In operating a hook constructed as described, the clevis 6 is connected with a cable or the like, having connection with the hoisting apparatus of a derrick, and a bail, such as is employed on tubing and rod elevators or the like, is applied as a means whereby the objects being hoisted may be easily and quickly connected or disconnected from the hoisting cable. The collar is shifted to lower position, moving the latch pin into bill-engaging position to latch the bail in the hook.

In Figs. 1 and 2 of the drawings the hook is shown closed by the latch pin 37 which is locked in its closed position by the collar 22, the locking lever 29 of the collar being engaged in the groove 19 of the shank, and the spring 27 extending into the groove 19.

In order to unlock the collar and the pin, the lever 29 is pivoted by pressure on the handle to release the nose 42 from the groove 19, and pressure is applied to overcome the resistance offered by the spring 27 and to depress the spring wholly into the groove 26 of the collar so that it may pass out of the groove 19 and over the shank.

The collar is shifted upward, carrying with it the latch pin 37 which is retracted into the opening 35, and when the groove 26 of the collar comes into alignment with the upper groove 18 in the shank, the spring expands into said groove to retain the collar in its upper position. The lever 29, urged by the spring 45, enters the groove 18, thus locking the collar against a downward shifting movement. Opposite operation effects the release of the lever 29 and spring, for restoring the pin 37 to hook-closing position.

Should it be desired to use only the frictional means for retaining the collar and latch pin 37 in open or closed position, the lever 29 may be removed from the collar 22 without impairing the effectiveness of the hook.

Should it for further reasons be desired to employ the lever means only for the purpose of retaining the collar in upper position, the spring clip 20 is applied in the recesses 21 for bridging the groove 18, thereby preventing the engagement of the spring 27 with said groove, the locking lever 29 being permitted to pass to locking or unlocking position between the open ends of the clip.

The internal bosses forming the bearing surfaces for sliding engagement of the collar with the shank tend to scrape the surface of the shank upon rotational as well as vertical movement of the collar, the edges of the bosses defined by the vertical grooves and annular recess dislodging material, and the grooves permitting departure of the material from the collar.

What I claim and desire to secure by Letters Patent is:

1. In an elevating hook, a body provided with a shank having spaced annular grooves, a collar slidable on the shank and provided with an internal groove registrable with one or another of said shank grooves, a hook-closing pin supported by the collar, and latching means in said collar groove projectable into said registering shank grooves to latch the collar against vertical movement on the shank.

2. In an elevating hook, a body having a shank provided with vertically spaced annular grooves, a collar slidable on the shank, resilient means supported by the collar adapted for engagement within one or the other of the grooves for locking the collar against vertical movement on the shank, and a hook-closing member supported by the collar.

3. In a hook of the character described, a body having a shank and a bill, a latching pin vertically slidable in the body and engageable with the bill to retain a bail on the hook, and means for locking the latching pin in open or closed position comprising a collar slidable on the shank and engaged with said latching pin, a locking lever pivoted in the collar, and means on the shank engageable by the lever to lock the collar against sliding on the shank.

4. In a hook of the character described, a body having a reduced shank provided with spaced annular grooves, a collar slidable on the shank and having an annular groove, a hook-latching pin vertically movable along the body and engaged with the collar, and a locking member carried in the annular groove in the collar, and selectively engageable in said grooves.

5. In a device of the character described, a body, a collar movable on the body and provided with internal arcuately faced bosses engaging the body, and means engaged with the collar for latching the same to the body.

6. In a hook of the character described, a body having a shank provided with spaced annular grooves, a collar slidable on the shank having an interior annular groove registerable with one or another of said shank grooves, means supported by the collar for closing the hook, and a resilient member in said collar groove normally extending into one or another of said shank grooves to lock the collar in selected position and adapted for compression wholly into said collar groove upon vertical movement of the collar.

7. In a hook of the character described, a body having a shank provided with spaced annular grooves, a collar slidable on the shank having an interior annular groove registerable with one or another of said shank grooves, means supported by the collar for closing the hook, a resilient member in said collar groove normally extending into one or another of said shank grooves to lock the collar in selected position and adapted for compression wholly into said collar groove upon vertical movement of the collar, a locking member movable into said shank grooves and positively locking the collar on the shank, means urging the locking member toward the shank, and a spring clip engageable with the shank to close the upper groove against admission of the resilient member thereinto.

8. A hook of the character described including a shank having an external annular groove, a collar slidable on the shank having an internal annular groove, a spring coiled in said collar groove and expansible into the shank groove to yieldingly hold the collar in set position in the shank, and a locking pin connected with the collar.

9. A hook of the character described including a shank having an external annular groove, a collar slidable on the shank having an internal annular groove a spring coiled in said collar groove and expansible into the shank groove to yieldingly hold the collar in set position in the shank, a lever pivoted on said collar and having a nose projectable into the shank groove to retain the collar, and a locking pin connected with the collar.

10. In a hook of the character described, a body portion including a bill, a reduced shank on the body forming a shoulder, a locking pin slidable in the body having an outwardly facing groove, a collar slidable and rotatable on the shank having an inturned flange extended into the pin groove, and means for retaining the collar in adjusted position on said shank.

In testimony whereof I affix my signature.

ADOLPH SCHILLINGER.